United States Patent
Yamamoto et al.

(10) Patent No.: US 8,751,226 B2
(45) Date of Patent: Jun. 10, 2014

(54) LEARNING A VERIFICATION MODEL FOR SPEECH RECOGNITION BASED ON EXTRACTED RECOGNITION AND LANGUAGE FEATURE INFORMATION

(75) Inventors: Hitoshi Yamamoto, Tokyo (JP); Kiyokazu Miki, Tokyo (JP)

(73) Assignee: NEC Corporation, Tokyo (JP)

( * ) Notice: Subject to any disclaimer, the term of this patent is extended or adjusted under 35 U.S.C. 154(b) by 991 days.

(21) Appl. No.: 12/306,632

(22) PCT Filed: Jun. 18, 2007

(86) PCT No.: PCT/JP2007/000642
§ 371 (c)(1),
(2), (4) Date: Dec. 24, 2008

(87) PCT Pub. No.: WO2008/001486
PCT Pub. Date: Jan. 3, 2008

(65) Prior Publication Data
US 2009/0204390 A1  Aug. 13, 2009

(30) Foreign Application Priority Data
Jun. 29, 2006  (JP) .................................. 2006-179619

(51) Int. Cl.
*G10L 15/00* (2013.01)
*G10L 15/06* (2013.01)
(52) U.S. Cl.
USPC ........................... 704/231; 704/243; 704/244
(58) Field of Classification Search
None
See application file for complete search history.

(56) References Cited

U.S. PATENT DOCUMENTS

| | | | |
|---|---|---|---|
| 4,837,831 A * | 6/1989 | Gillick et al. | 704/245 |
| 5,797,123 A | 8/1998 | Chou et al. | |
| 5,835,893 A * | 11/1998 | Ushioda | 704/257 |
| 6,442,519 B1 * | 8/2002 | Kanevsky et al. | 704/243 |
| 6,574,597 B1 * | 6/2003 | Mohri et al. | 704/251 |
| 6,622,119 B1 * | 9/2003 | Ramaswamy et al. | 704/9 |
| 7,031,917 B2 * | 4/2006 | Asano | 704/238 |
| 2004/0249628 A1 * | 12/2004 | Chelba et al. | 704/4 |
| 2005/0137849 A1 * | 6/2005 | Parkinson | 704/4 |
| 2006/0287856 A1 * | 12/2006 | He et al. | 704/256 |

FOREIGN PATENT DOCUMENTS

| | | |
|---|---|---|
| JP | 8-083091 A | 3/1996 |
| JP | 10-116094 A | 5/1998 |
| JP | 2001-134285 | 5/2001 |
| JP | 2003-263187 | 9/2003 |

(Continued)

OTHER PUBLICATIONS

Rose et al. "Integration of utterance verification with statistical language modeling and spoken language understanding". Speech Communication 34, 2001, pp. 321-331.*

(Continued)

*Primary Examiner* — Jesse Pullias
(74) *Attorney, Agent, or Firm* — Dickstein Shapiro LLP (57) ABSTRACT

A speech processing apparatus 101 includes a recognition feature extracting unit 12 that extracts recognition feature information which is a characteristic of a speech recognition result 15 obtained by performing a speech recognition process on an inputted speech from the speech recognition result 15; a language feature extracting unit 11 that extracts language feature information which is a characteristic of a pre-registered language resource 14 from the language resource 14; and a model learning unit 13 that obtains a verification model 16 by a learning process based on the extracted recognition feature information and language feature information.

26 Claims, 6 Drawing Sheets

(56) References Cited

FOREIGN PATENT DOCUMENTS

| JP | 2005-084436 | 3/2005 |
|---|---|---|
| JP | 2005-275348 | 10/2005 |
| JP | 2006-85012 | 3/2006 |
| JP | 2006-113570 | 4/2006 |

OTHER PUBLICATIONS

R. Lau, et al., "Trigger-Based Language Models: A Maximum Entropy Approach", 1993 IEEE International Conference on Acoustics, Speech, and Signal Processing proceedings, (U.S.), Institute of Electrical and Electronics Engineers (IEEE), 1993, vol. 2, pp. 45-48.

D. Gildea and T. Hofmann, "Topic-Based Language Models Using EM", Sixth European Conference on Speech Communication and Technology (EUROSPEECH '99) proceedings, International Speech Communication Association (ISCA) 1999, pp. 2167-2170.

A. Berger and R. Miller, "Just-in-Time Language Modeling," 1998 IEEE International Conference on Acoustics, Speech, and Signal Processing proceedings, (U.S.), Institute of Electrical and Electronics Engineers), 1998, vol. 2, pp. 705-708.

J. Lafferty, et al., "Conditional Random Fields: Probabilistic Models for Segmenting and Labeling Sequence Data," 18th International Conference of Machine Learning proceedings, 2001, pp. 282-289.

Tsuboi et al., "Gengo Shori ni Okeru Shinkibesu Model no. Hatten—HMM kara CRF made," The Association for Natural Language Processing Dai 12 Kai Nenji Taikai (NLP2006) Tutorial Shiryo, Mar. 13, 2006, pp. 1-10.

Azuma, et al., "Japanese Unknown Word Processing using Conditional Randon Fields" Information Processing Society of Japan Kenkyu Hokoku, vol. 2006, No. 53, May 18, 2006, pp. 67-74.

\* cited by examiner

LEARNING A VERIFICATION MODEL FOR SPEECH RECOGNITION BASED ON EXTRACTED RECOGNITION AND LANGUAGE FEATURE INFORMATION

TECHNICAL FIELD

The present invention is directed to a speech recognition technology that converts a speech into electrical data such as text data, and in particular, to a technology for verifying a result of a speech recognition process.

BACKGROUND ART

A speech recognition device sometimes outputs a so-called ungrammatical sentence, such as an ungrammatical word sequence or a word sequence having no normal meaning, as a result of a speech recognition process. In a related art, there has been suggested a method of determining correctness and fault of a recognition result based on a scale of confidence measure in order to detect the recognition errors that cause these ungrammatical sentences. This method has been described, for example, in Patent Document 1 to be described later.

Figure 6:
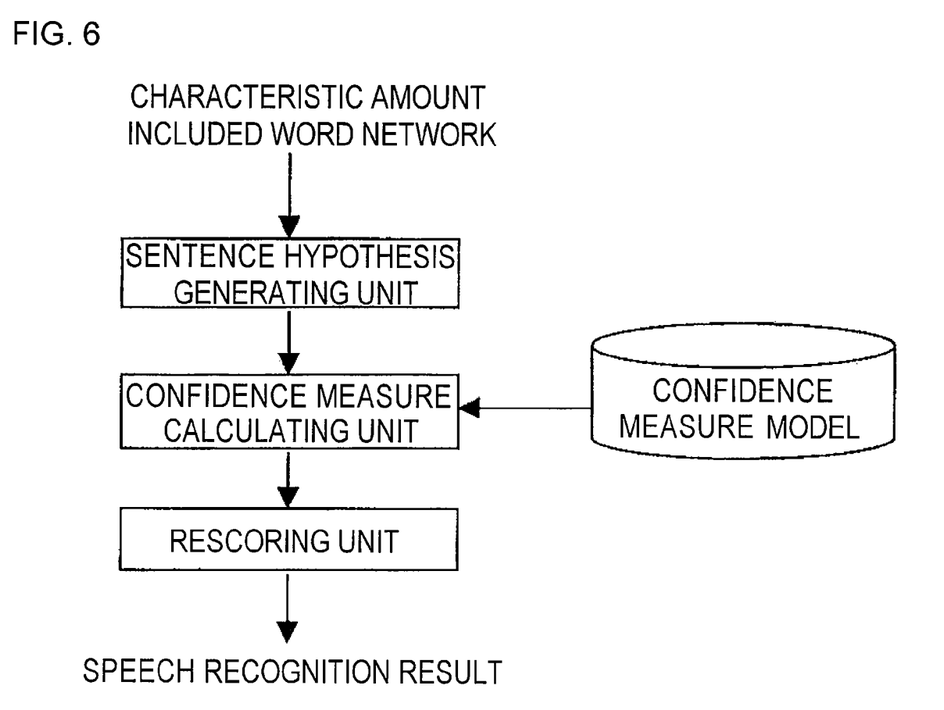
FIG. 6 is a block diagram illustrating a construction of a speech processing apparatus in a related art.

The technology described in Patent Document 1 is associated with conducting rescoring by using a confidence measure model obtained by integrating plural confidence measures that originate from a speech recognizing unit used when a recognition result is obtained. A speech recognition system using this technology generates plural sentence hypotheses including a characteristic amount by a sentence hypothesis generating unit from a characteristic amount-included word network including a recognition result of an inputted speech and the characteristic of the recognition result as shown in FIG. 6. And, the confidence measure of each sentence hypothesis is calculated based on the generated sentence hypothesis and confidence measure model by a confidence measure calculating unit, and a sentence hypothesis whose order has been changed based on the confidence measure is outputted as a result of speech recognition by a rescoring unit.

In the meanwhile, in a speech recognition process a speech is converted into data using a language model that functions as a reference, and there have been suggested the following technologies to raise accuracy of the language model. For example, there exist a method of using a relationship between words that are far off from each other as described in Non-patent Document 1 to be described later, a method of optimizing the entire documents using topic information as described in Non-patent Document 2, and a method of using corpuses obtain able from WWW to estimate the appearance probability of a word as described in Non-patent Document 3.

Patent Document 1: Japanese unexamined patent application publication No. 2006-85012

Non-patent Document 1: R. Lau, R. Rosenfeld, S. Roukos, "Trigger-Based Language Models: A Maximum Entropy Approach", 1993 IEEE International Conference on Acoustics, Speech, and Signal Processing proceedings, (U.S.), IEEE (Institute of Electrical and Electronics Engineers), 1993, Volume 2, pp. 45-48

Non-patent Document 2: D. Gildea, T. Hofmann, "Topic-Based Language Models Using EM", Sixth European Conference on Speech Communication and Technology (EUROSPEECH '99) proceedings, ISCA (International Speech Communication Association), 1999, pp. 2167-2170

Non-patent Document 3: A. Berger and R. Miller, "Just-in-time Language Modeling", 1998 IEEE International Conference on Acoustics, Speech, and Signal Processing proceedings, (U.S.), IEEE (Institute of Electrical and Electronics Engineers), 1998, Vol. 2, pp. 705-708

Non-patent Document 4: J. Lafferty et al., "Conditional Random Fields Probabilistic Models for Segmenting and Labeling Sequence Data", 18th International Conference of Machine Learning proceedings, 2001, pp. 282-289

DISCLOSURE OF THE INVENTION

However, the method of using the confidence measure model described in Patent Document 1 has a problem of likelihood of not being capable of obtaining sufficient accuracy in evaluating linguistic accuracy or confidence measure of a speech recognition result. That is why only part of features, such as scores upon recognition calculation or complexity of a word network, which originate from a speech recognizing unit are considered as the featuring values used for evaluating confidence measure of speech recognition results. Accordingly, there is a problem that it is difficult to avoid that an ungrammatical sentence including a word that is not appropriate for topics at the current time or context, or an ungrammatical word is included into the speech recognition result.

Also, the methods described in Non-patent Documents 1 to 3 have their own advantages, however, are not easy to treat in terms of complexity of modeling or accuracy of learn, and the amount of process in case of being simultaneously applied to a language model for a practical purpose.

The present invention has been designed in consideration of the above problems, and an object of the present invention is to provide a verification model that may raise the accuracy in verifying a recognition result of a speech recognition process.

According to the present invention, there is provided a speech processing apparatus comprising a recognition feature information extracting unit which extracts recognition feature information having a characteristic of recognition result data obtained by performing a speech recognition process on an inputted speech, from the recognition result data; a language feature information extracting unit which extracts language feature information having a characteristic of a pre-registered language resource from the pre-registered language resource; and a verification model obtaining unit which obtains a verification model by a learning process based on the extracted recognition feature information and language feature information.

A program according to the present invention enables a computer to function as the speech processing apparatus.

According to the present invention, there is provided a speech processing method comprising extracting recognition feature information having a characteristic of recognition result data obtained by performing a speech recognition process on an inputted speech, from the recognition result data by a speech processing apparatus; extracting language feature information having a characteristic of a pre-registered language resource from the pre-registered language resource by the speech processing apparatus; and obtaining a verification model by a learning process based on the extracted recognition feature information and language feature information by the speech processing apparatus.

Moreover, any combinations of the above components and any variation of the present invention in expression among a method, a device, a system, a recording medium, and a computer program are also valid as an aspect of the present invention.

BRIEF DESCRIPTION OF THE DRAWINGS

The foregoing objects and the other objects, features, and advantages will be more apparent from an exemplary embodiment to be described below and accompanying drawings.

BEST MODE FOR CARRYING OUT THE INVENTION

Hereinafter, exemplary embodiments of the present invention will be described with reference to accompanying drawings. Throughout the entire drawings, the same components refer to the same reference numerals, and the detailed descriptions will be not shown.

First Exemplary Embodiment

Figure 1:
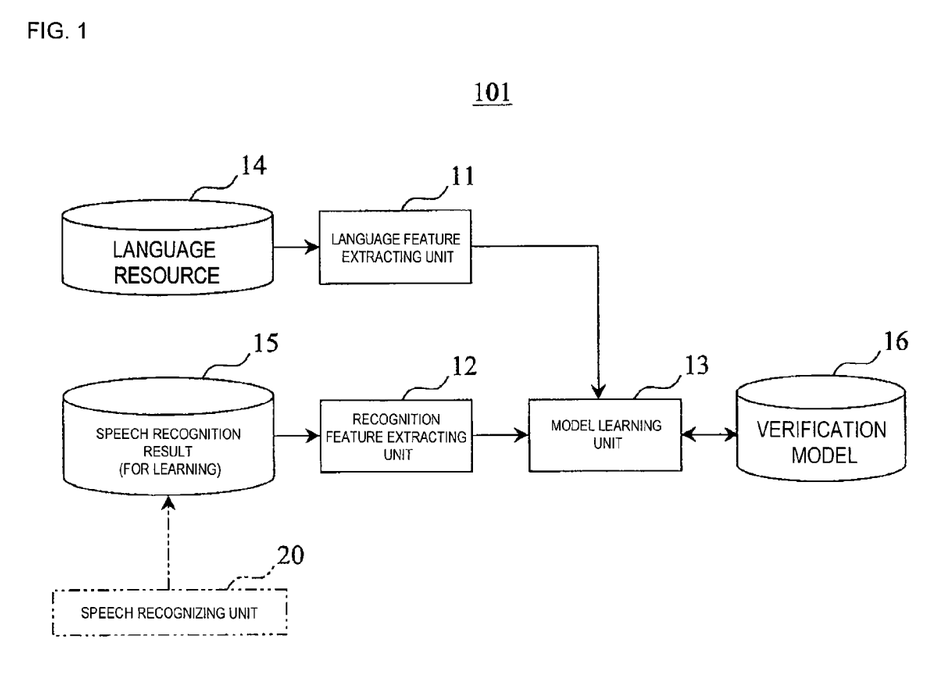
FIG. 1 is a block diagram illustrating a construction of a speech processing apparatus according to an exemplary embodiment of the present invention.

FIG. 1 depicts a construction of a speech processing apparatus according to an exemplary embodiment of the present invention. The speech processing apparatus 101 according to the exemplary embodiment of the present invention includes a recognition feature information extracting unit (recognition feature extracting unit 12) that extracts recognition feature information having a characteristic of recognition result data (speech recognition result for learning 15) obtained by performing a speech recognition process on an inputted speech, from the recognition result data; a language feature information extracting unit (language feature extracting unit 11) that extracts language feature information having a characteristic of a pre-registered language resource 14 from the pre-registered language resource 14; and a verification model obtaining unit (model learning unit 13) that obtains a verification model 16 by a learning process based on the extracted recognition feature information and language feature information.

The speech processing apparatus 101 according to the exemplary embodiment includes the language feature extracting unit 11, the recognition feature extracting unit 12, the model learning unit 13, the language resource 14, the speech recognition result for learning 15, and the verification model 16. The language feature extracting unit 11, the recognition feature extracting unit 12, and the model learning unit 13 are constitutional elements that correspond to a program executed by a CPU (not shown) of the speech processing apparatus 101. The language resource 14, the speech recognition result for learning 15, and the verification model 16 are data stored in a memory device (not shown) of the speech processing apparatus 101.

Each constitutional element of the speech processing apparatus 101 is realized by any combination of hardware and software based on a CPU of any computer, a memory, a program that is loaded on the memory to implement the components shown in the drawings, a memory unit such as a hard disk that stores the program, and an interface for network connection. It will be understood by those skilled in the art that a diversity of variations of a method and device of realizing the components may be made. Each of drawings to be described herein after does not depict hardware-based constructions but function-based blocks.

The language resource 14 refers to original data from which linguistic rules or features are extracted. In an exemplary embodiment, the language resource 14 is a language resource that is prepared beforehand, such as an aggregate of document data registered for each and every domain that is subjected to speech recognition, an aggregate of grammatical/ungrammatical sentences separated in terms of grammar or meaning, an aggregate of text data collected from WWW, or a keyword dictionary for each and every topic.

The language feature extracting unit 11 analyzes the language resource 14, extracts a predetermined language feature, and provides the extracted language feature to the model learning unit 13. In an exemplary embodiment, the language feature includes an attribute of a word (transcription, pronunciation, parts-of-speech, subparts-of-speech, case patterns, inflectional forms, meaning attributes, synonyms, and the like), a relationship between words having a large distance (co-occurrence, dependency, anaphora, and the like), a sentence structure (lexical structures, components of a sentence, grammatical patterns, chapter/clause/paragraph structures, turn-and-conclusion structures, and the like), meaning contents of a sentence (subject words of document/paragraph/sentence, summary, key words, and the like), and the like.

Here, the extraction of a feature refers to calculating of the value of a corresponding feature or processing of the frequency of appearance of the feature. And, the relationship between words having a large distance refers to a relationship between words having a larger distance between words than a predefined value in a language model used for speech recognition. Specifically, a relationship between words having a distance between words more than N corresponds to this, for example, in an N-Gram.

The speech recognition result for learning 15 represents a recognition hypothesis outputted by a speech recognizing unit 20 with respect to a pre-entered speech. For example, the speech recognition result for learning 15 is represented as a word graph including plural recognition hypotheses or an N best word sequence. Also, the speech recognition result for learning 15 may be associated with speech content of the entered speech and then granted with information on correctness and fault.

The recognition feature extracting unit 12 data-analyzes the speech recognition result for learning 15, extracts a predetermined recognition feature, and provides the extracted recognition feature to the model learning unit 13. In an exemplary embodiment, the recognition feature refers to a characteristic amount of a recognition system such as an acoustic score, a language score, a word posteriori probability, an acoustic stability, a word hypothesis density, the number of active HMMs, the average frame number of a phoneme, a back-off case, a history of correct or false label of a word hypothesis, as described in the above-mentioned Patent Document 1, and a characteristic amount such as transcription, pronunciation, parts-of-speech, inflectional forms, the length of transcription or pronunciation, the number or type of included phonemes, distribution of continuous time length of phoneme, the number of branches of the graph before and after a word, words that competes with one another, and a graph density as a feature of another recognition result.

The model learning unit 13 outputs a verification model 16 that is obtained by a learning process based on the feature extracted by the language feature extracting unit 11 and the recognition feature extracting unit 12. The learning method depends on formulation of the model. The verification model 16 may utilize conditional random fields (CRFs) as a discriminative model in an exemplary embodiment. At this time, the verification model 16 may be defined as the following equation 1.

$$P(y \mid x) = \frac{1}{Z_x} \sum \exp(\Lambda \cdot \Phi(y, x)) \quad \text{[Equation 1]}$$

In the equation 1, "x" is to observation data that is subjected to verification; for example, x is the speech recognition result for learning 15. And, "y" is to a result of verification; for example, y is a correct and false label or degree of importance according to use. "Λ" is to an aggregate of model parameters. "Φ(y, x)" is to an aggregate of feature values and corresponds to each of the language feature and the recognition feature that are extracted by the language feature extracting unit 11 and the recognition feature extracting unit 12, respectively, or a combination in or between words thereof. "Zx" is to a normalization term. Besides, other discriminative models such as a neural network, hidden Markov model, or support vector machine may be used as the verification model 16.

The model learning unit 13 may yield a conditional random field model as a discriminative model. The model learning unit 13 estimates parameter update equations based on the maximization of conditional likelihood according to a repetitive optimization scheme in a case where the verification model 16 is a conditional random field represented in the equation 1. Details on the estimation have been described in, for example, Non-patent Document 4.

Thereafter, the verification model 16 made by the model learning unit 13 is used for verification of data obtained as a result of the speech recognition process.

Figure 2:
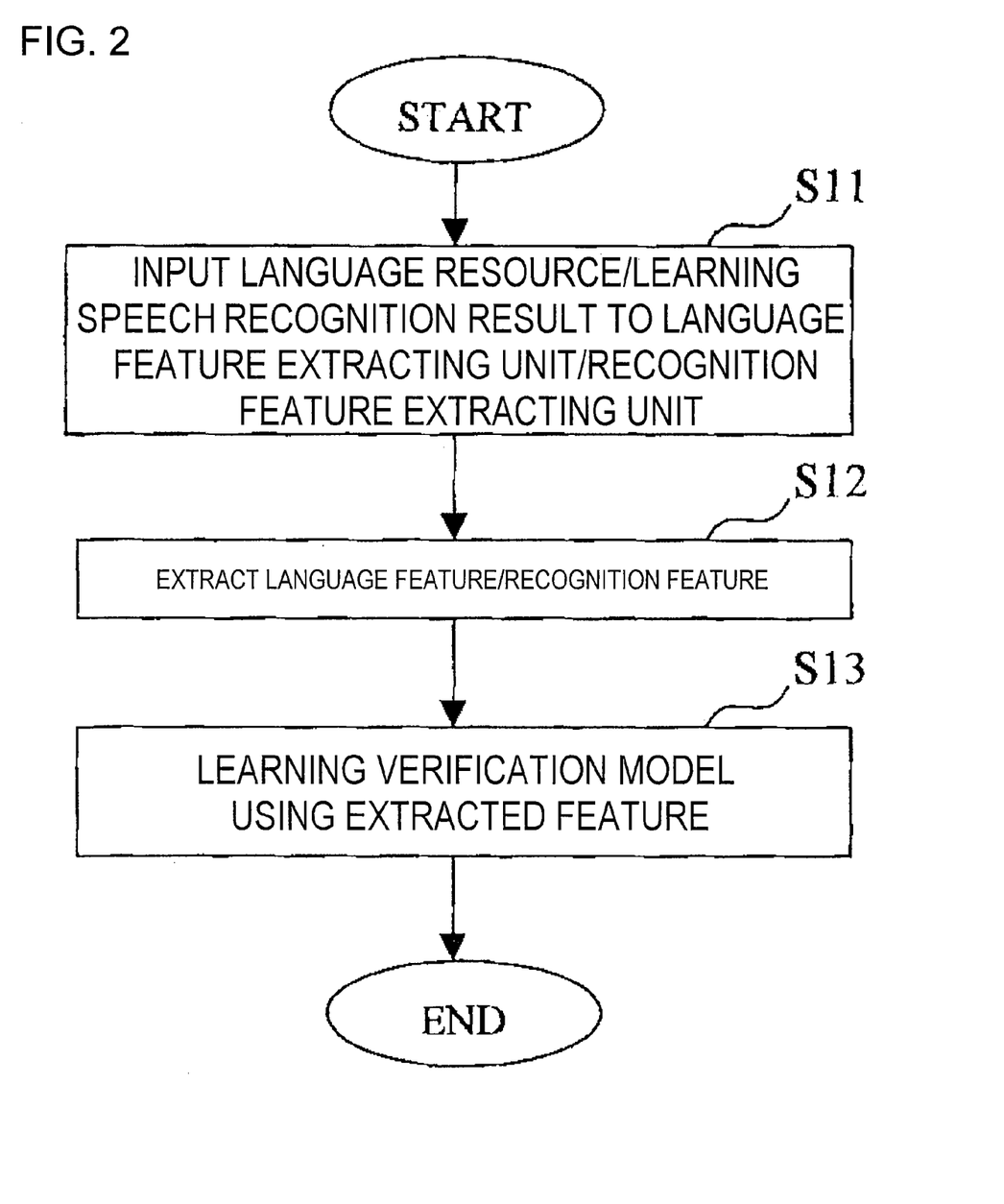
FIG. 2 is a flowchart illustrating an operating procedure of the speech processing apparatus shown in FIG. 1.

An operation of the speech processing apparatus 101 will be described with reference to the flowchart shown in FIG. 2. The speech processing apparatus 101 reads the language resource 14 and the speech recognition result for learning 15 from the memory device, inputs the language resource 14 to the language feature extracting unit 11, and inputs the speech recognition result for learning 15 to the recognition feature extracting unit 12 (step S11).

The language feature extracting unit 11 extracts the language feature from the inputted language resource 14, and the recognition feature extracting unit 12 extracts the recognition feature from the speech recognition result for learning 15 (step S12). And, the model learning unit 13 obtains the verification model 16 by a learning process using the extracted recognition feature and language feature, and stores it in the memory device (step S13).

According to the first exemplary embodiment described above, it is possible to simultaneously insert into a verification model a number of language features that are considered that it is difficult to directly reflect onto a language model of speech recognition as well as recognition features. This enables improve the accuracy of the verification model 16. Further, the more language resources 14 are prepared, the more types of language features may be secured, and this may improve robustness of model learning.

According to the present invention, it is possible to obtain a verification model with good accuracy from the point of view that the verification model is learned using recognition feature information that originates from results of speech recognition processing and language feature information that originates from linguistic characteristics of an existing word sequence.

Further, the language features may be extracted based on information indirectly obtained from user's actions as an alternate process of the above language feature extracting unit 11. Specifically, characteristics such as importance or similarity of a document (sentence/word), are obtained for example, based on a use history including user's reference frequency or reference history with respect to the document and the obtained characteristics are used for learning as a language feature.

Further, the features may be extracted from information preset according to user's use purpose as an alternate process of the language feature extracting unit 11. For example, information such as importance of a word (important/common/ unnecessary) or type of a sentence (greeting sentence, questioning sentence, responding sentence) is preset by a user with respect to the language resource 14 or speech recognition result for learning 15, and this may be adopted as a language feature used for model learning. For example, a word list (dictionary) according to importance which is made from a word sequence as a speech recognition result that has been already acquired may be previously registered as the language resource 14.

Second Exemplary Embodiment

Figure 3:
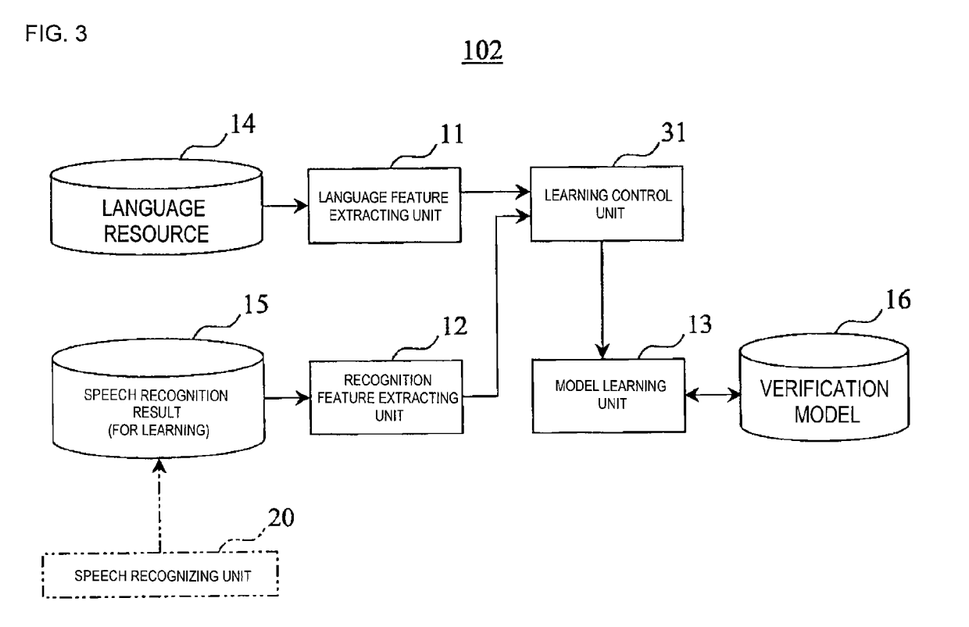
FIG. 3 is a block diagram illustrating a construction of a speech processing apparatus according to an exemplary embodiment of the present invention.

FIG. 3 depicts a construction of a speech processing apparatus according to an exemplary embodiment of the present invention. The speech processing apparatus 102 according to the exemplary embodiment further includes a learning control unit 31 in its construction in addition to the construction of the speech processing apparatus 101 shown in FIG. 1 according to the exemplary embodiment described above.

The learning control unit 31 performs selecting process of selecting the type of features to be used in the model learning unit 13 with respect to the features extracted by the language feature extracting unit 11 and the recognition feature extracting unit 12, and performs weighting process with respect to feature values so as to provide the result to the model learning unit 13.

There is a method, for example, which selects a feature whose appearance frequency is larger than a predetermined value, as a method of selecting the type of features. The learning control unit 31 may select the type of language feature information and recognition feature information to be used for learning process based on the appearance frequency in the recognition result data (speech recognition result 15) and the language resource 14. Also, in a case where the feature is a concurrent word, a method also may be available which changes threshold value of the appearance frequency according to the distance between words, or uses only features whose appearance frequency is highly ranked among the appropriate features.

The learning control unit 31 may set the weighted values according to the type of the language feature information and recognition feature information. The adjustment (set) of the weighted value of a feature may be realized by making the feature value great if the concurrent word is an independent word (by having the feature value unchanged if the concurrent word is a dependent word), for example, in a case where the recognition result is an independent word and the feature is a concurrent word. Further, the weights may be varied according to the distance between words.

There is a method of using a hierarchical relationship between features as another method of adjusting the weights. The learning control unit 31 may set a weighted value using a hierarchical relationship between features. For example, in a case where there is a hierarchical relationship between features like a case where a per-sentence feature exists at the lower level of a per-paragraph feature, the weighted value is adjusted to make the low-level feature value great in a case where the upper-level feature has the small appearance frequency, make the summed value of both weighted values as a new feature value, or make the ratio of appearance frequency of both constant. As such, the learning control unit 31 may calculate a weighting sum for each of the recognition feature information and language feature information using the weighted value set to each of the language feature information and recognition feature information, and set the calculated weighting sum as the feature value. Also, the weighted value adjustment of a feature may be performed by adjusting parameter values of a model in a case where the above-mentioned conditional random field is used for the verification model 16.

Figure 4:
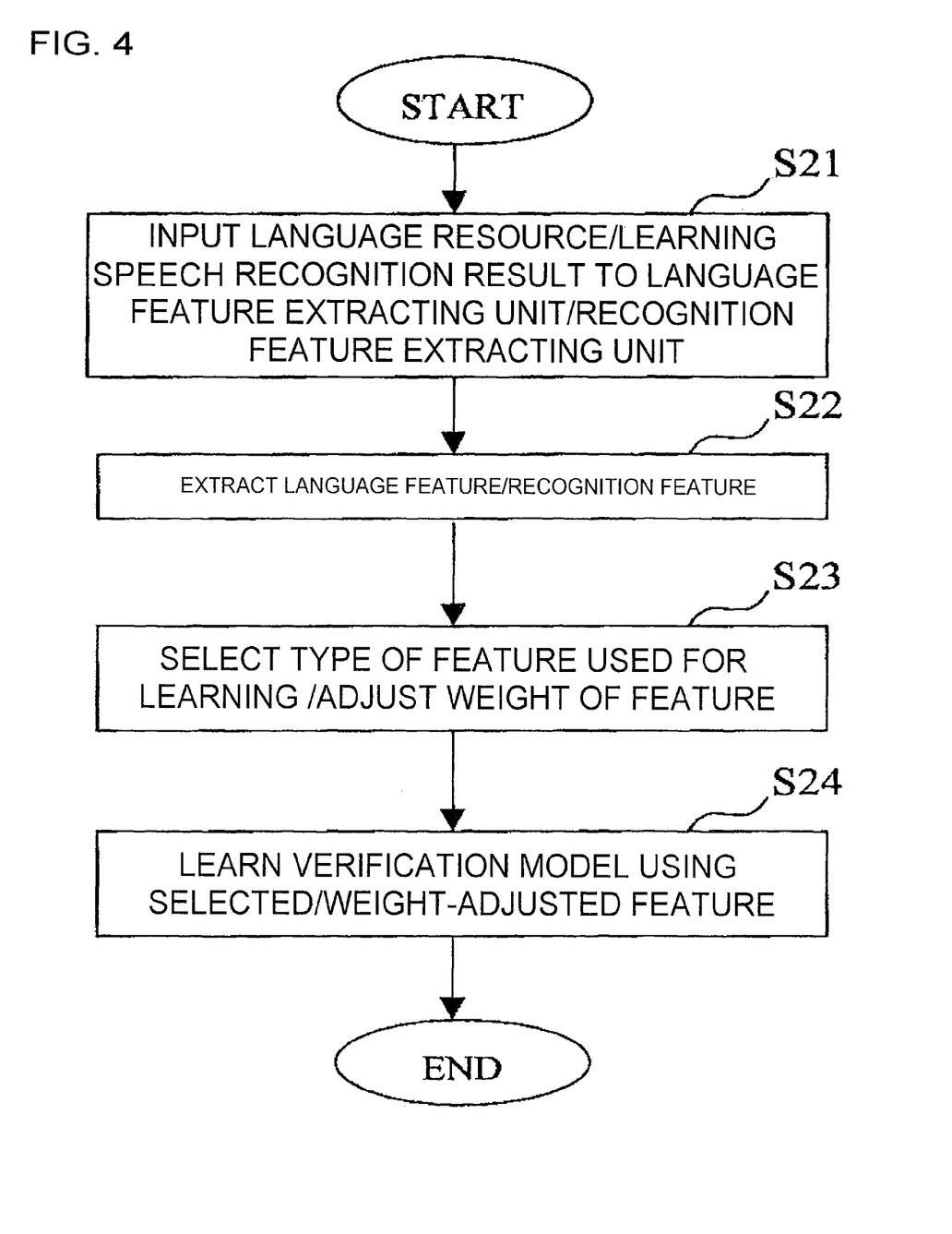
FIG. 4 is a flowchart illustrating an operating procedure of the speech processing apparatus shown in FIG. 3.

An operation of the speech processing apparatus 102 will be described with reference to the flowchart shown in FIG. 4. The processes performed before the language feature extracting unit 11 and the recognition feature extracting unit 12 respectively extract the feature (steps S21 and S22) have the same procedures as that described above with reference to FIG. 2 with respect to the speech processing apparatus 101, and their descriptions will be not shown.

The learning control unit 31 selects the type of a feature used for a learning process of the verification model 16 based on the extracted language feature and recognition feature, and adjusts the weighting of the feature value (step S23). And, the model learning unit 13 then performs a learning process of the verification model 16 using the language feature and the recognition feature that have been subjected to processes of the learning control unit 31, and preserves it (step S24).

The speech processing apparatus 102 according to the exemplary embodiment may narrow the features used for learning by performing selection of the type of feature or adjustment of the weights, and therefore, secure as much learning data as appropriate with respect to the number of parameters of a model. By doing so, the model learning unit 13 may learning the verification model 16 effectively and robustly.

Third Exemplary Embodiment

Figure 5:
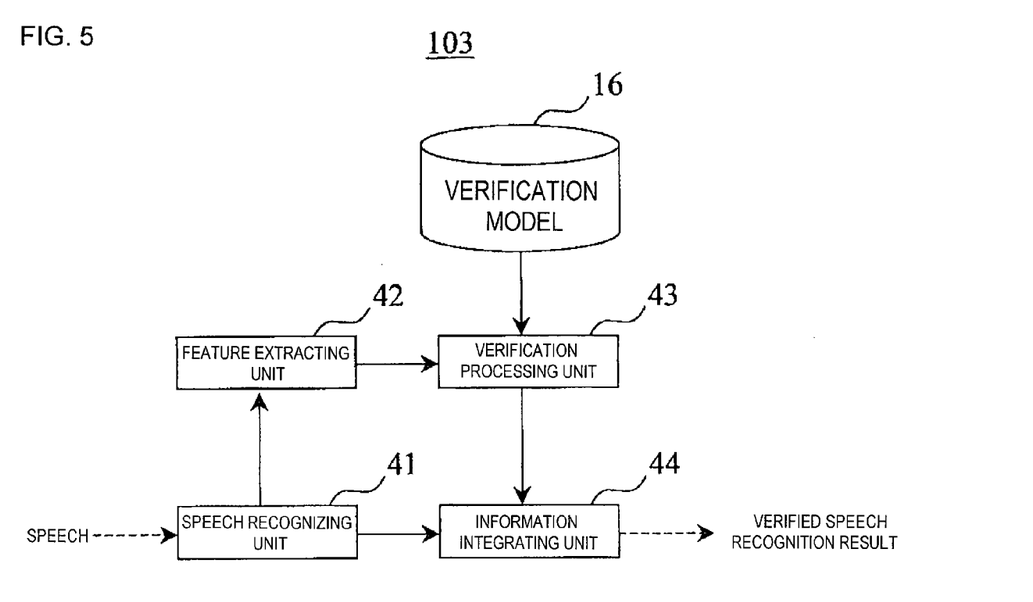
FIG. 5 is a block diagram illustrating a construction of a speech processing apparatus using a verification model obtained by a speech recognition process according to an exemplary embodiment of the present invention.

FIG. 5 depicts a construction example of a speech processing apparatus that provides information related to verification of a speech recognition result using the verification model 16 shown in FIG. 1 or 3. The speech processing apparatus 103 includes a verification unit which verifies recognition result data (output from a speech recognizing unit 41 shown in FIG. 5) that is newly inputted as a verification target using the verification model 16. Specifically, the speech processing apparatus 103 includes the speech recognizing unit 41, a feature extracting unit 42, a verification processing unit 43, and an information integrating unit 44.

In the shown construction, the speech recognizing unit 41 has a function corresponding to the speech recognizing unit 20 shown in FIG. 1 or 3, and the feature extracting unit 42 has a function corresponding to the language feature extracting unit 11 and the recognition feature extracting unit 12. A correct/wrong label may be assigned, for example, simply, to a word sequence of a recognition hypothesis by the speech processing apparatus 103. The speech processing apparatus 103 operates as follows.

When a speech is inputted to the speech processing apparatus 103, the speech recognizing unit 41 generates a recognition hypothesis of the inputted speech, and the feature extracting unit 42 extracts a predetermined recognition feature and language feature with respect to the recognition hypothesis. The verification processing unit 43 calculates a verification result and its confidence measure score with reference to the extracted feature and the verification model 16 prepared according to the above exemplary embodiments. The information integrating unit 44 integrates the recognition hypothesis generated by the speech recognizing unit 41 and the result of the verification process by the verification processing unit 43 and outputs it as a verification complete speech recognition result. By doing so, the speech processing apparatus 103 may perform the step of verifying the recognition result data (output from the speech recognizing unit 41) newly inputted as a verification target using the verification model 16.

The speech processing apparatus 103 may conduct assignment of a label or assignment of the confidence measure to a word sequence of a recognition hypothesis generated by the speech recognizing unit 41 according to use of the speech recognition result with good accuracy.

In a case where a conditional random field is used for the verification model 16, there are provided merits such as: making it possible to identify lots of classes; making it possible to acquire confidence measure in recognition results; making it possible to rank the priority of the recognition results; and achieving optimization not on a per-word basis but on a per-word sequence basis corresponding to one speech. As such, the speech processing apparatus 103 is appropriate for treatment of the word graph of a speech recognition result and may easily configure the rear-stage process of the speech recognizing unit 41.

While the present invention have been described reference with the exemplary embodiments, such description is for illustrative purposes only, and it is to be understood that modifications and variations may be made without departing from the spirit or scope of the present inventions.

This application is based upon and claims the benefit of priority from Japanese patent application No. 2006-179619, filed on Jun. 29, 2006, and the disclosure of which is incorporated herein in its entirety by reference.

The invention claimed is:

1. A speech processing apparatus comprising:
   a recognition feature information extracting unit which extracts recognition feature information having a characteristic of recognition result data obtained by performing a speech recognition process on an inputted speech, from said recognition result data, said recognition feature information being speech recognition result data for learning which includes plural recognition hypotheses;
   a language feature information extracting unit which extracts language feature information having a characteristic of a pre-registered language resource from said pre-registered language resource, said pre-registered language resource including document data, sentences, text data, word sequences, or dictionaries, the extracted language feature information including linguistic characteristics included in an existing word sequence, or importance of similarity of a document; and
   a verification model obtaining unit which obtains a verification model by a learning process based on the extracted recognition feature information and language feature information, the obtained verification model being used to verify a speech recognition result data which is inputted as a verification target to a speech recognition system, wherein said verification model obtaining unit obtains a discriminative model as said verification model, said discriminative model being indicative of a correct and false label or degree of importance according to use.

2. The speech processing apparatus as set forth in claim 1, further comprising a selecting unit which selects the type of said recognition feature information and language feature information to be used for said learning process.

3. The speech processing apparatus as set forth in claim 2, wherein said selecting unit selects the type of said recognition feature information and language feature information to be used for said learning process based on appearance frequency of said recognition result data and language resource.

4. The speech processing apparatus as set forth in claim 1, further comprising a weighted value setting unit which sets a weighted value of said recognition feature information and language feature information to be used for said learning process.

5. The speech processing apparatus as set forth in claim 4, wherein said weighted value setting unit sets said weighted value according to the type of said recognition feature information and language feature information.

6. The speech processing apparatus as set forth in claim 4, wherein said weighted value setting unit calculates a weighting sum for each of said recognition feature information and language feature information using said weighted value set to each of said recognition feature information and language feature information, and adopts the calculated weighting sum as a feature value.

7. The speech processing apparatus as set forth in claim 1, further comprising a verification unit which verifies recognition result data newly inputted as a verification target using said verification model.

8. The speech processing apparatus as set forth in claim 1, wherein said language feature information extracting unit extracts said language feature information based on a use history with respect to a pre-registered language resource.

9. The speech processing apparatus as set forth in claim 1, wherein said verification model obtaining unit obtains a conditional random field model as said discriminative model.

10. The speech processing apparatus as set forth in claim 1, wherein said language feature information includes a relationship between words having a large distance, a sentence structure, and meaning contents of a sentence.

11. The speech processing apparatus as set forth in claim 1, wherein said language feature information extracting unit obtains characteristics including importance or similarity of a document based on a use history including a user's reference frequency or reference history with respect to a group of the document, said verification model obtaining unit uses the obtained characteristics for learning as said language feature information.

12. The speech processing apparatus as set forth in claim 1, wherein said language feature information extracting unit extracts said language feature information from information including importance of a word or type of a sentence which is preset with respect to said pre-registered language resource or said speech recognition result for learning according to a user's use purpose.

13. The speech processing apparatus as set forth in claim 1, wherein further comprises:
a feature extracting unit which extracts a predetermined recognition feature and language feature with respect to recognition hypothesis obtained by performing the speech recognition process on the inputted speech;
a verification processing unit which calculates a verification result and its confidence measure score with reference to said feature extracted by said feature extracting unit and said verification model previously obtained by said verification model obtaining unit; and
an information integrating unit which integrates said recognition hypothesis and the result of the verification process by said verification processing unit and outputs it as a verification complete speech recognition result.

14. The speech processing apparatus as set forth in claim 1, wherein said language feature information extracting unit calculates value of a corresponding feature or processes frequency of appearance of feature.

15. A non-transitory computer-readable medium that causes a computer to function as the speech processing apparatus as set forth in claim 1.

16. A speech processing method comprising:
extracting recognition feature information having a characteristic of recognition result data obtained by performing a speech recognition process on an inputted speech, from said recognition result data by a speech processing apparatus, said recognition feature information being speech recognition result data for learning which includes plural recognition hypotheses;
extracting language feature information having a characteristic of a pre-registered language resource from said pre-registered language resource by said speech processing apparatus, said pre-registered language resource including document data, sentences, text data, word sequences, or dictionaries, the extracted language feature information including linguistic characteristics included in an existing word sequence, or importance or similarity of a document; and
obtaining a verification model by a learning process based on the extracted recognition feature information and language feature information by said speech processing apparatus, the obtained verification model being used to verify a speech recognition result data which is inputted as a verification target to a speech recognition system, wherein said obtained verification model is a discriminative model, said discriminative model being indicative of a correct and false label or degree of importance according to use.

17. The speech processing method as set forth in claim 16, further comprising selecting the type of recognition feature information and language feature information to be used for said learning process by said speech processing apparatus.

18. The speech processing method as set forth in claim 17, wherein said type selecting by said speech processing apparatus selects the type of said recognition feature information and language feature information based on appearance frequency of said recognition result data and language resource.

19. The speech processing method as set forth in claim 16, further comprising setting a weighted value of the recognition feature information and language feature information to be used for said learning process by said speech processing apparatus.

20. The speech processing method as set forth in claim 19, wherein said setting the weighted value by said speech processing apparatus sets said weighted value according to the type of said recognition feature information and language feature information.

21. The speech processing method as set forth in claim 19, wherein said setting the weighted value by said speech processing apparatus calculates a weighting sum for each of said recognition feature information and language feature information using said weighted value set to each of said recognition feature information and language feature information, and adopts the calculated weighting sum as a feature value.

22. The speech processing method as set forth in claim 16, further comprising verifying recognition result data newly inputted as a verification target using said verification model by the speech processing apparatus.

23. The speech processing method as set forth in claim 16, wherein said extracting the language feature information by said speech processing apparatus extracts said language feature information based on a use history with respect to a pre-registered language resource.

24. The speech processing method as set forth in claim 16, wherein said obtaining said verification model by said speech processing apparatus obtains a conditional random field model as said discriminative model.

25. The speech processing method as set forth in claim 16, wherein said extracting the recognition feature information by said speech processing apparatus extracts an attribute regarding transcription represented by said recognition result data, part of speech of said recognition result data, and pronunciation of said recognition feature information.

26. A speech processing apparatus comprising:
    means for extracting recognition feature information having a characteristic of recognition result data obtained by performing a speech recognition process on an inputted speech, from said recognition result data, said recognition feature information being speech recognition result data for learning which includes plural recognition hypotheses;
    means for extracting language feature information having a characteristic of a pre-registered language resource from said pre-registered language resource, said pre-registered language resource including document data, sentences, text data, word sequences, or dictionaries, the extracted language feature information including linguistic characteristics included in an existing word sequence, or importance or similarity of a document; and
    means for obtaining a verification model by a learning process based on the extracted recognition feature information and language feature information, the obtained verification model being used to verify a speech recognition result data which is inputted as a verification target to a speech recognition system, wherein said obtained verification model is a discriminative model, said discriminative model being indicative of a correct and false label or degree of importance according to use.

\* \* \* \* \*